US012636904B2

(12) United States Patent
Riedl et al.

(10) Patent No.: US 12,636,904 B2
(45) Date of Patent: May 26, 2026

(54) SECURITY FEATURE FOR A VALUABLE DOCUMENT, VALUABLE DOCUMENT, METHOD FOR PRODUCING A SECURITY FEATURE AND METHOD FOR CHECKING A SECURITY FEATURE

(71) Applicant: GIESECKE+DEVRIENT EPAYMENTS GMBH, Munich (DE)

(72) Inventors: Josef Riedl, Attenkirchen (DE); Gunter Endres, Passau (DE); Klaus Kohl, Miesbach (DE); Cristina Fabian, Garching (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 183 days.

(21) Appl. No.: 18/556,841

(22) PCT Filed: Apr. 26, 2022

(86) PCT No.: PCT/EP2022/025180
§ 371 (c)(1),
(2) Date: Oct. 23, 2023

(87) PCT Pub. No.: WO2022/228728
PCT Pub. Date: Nov. 3, 2022

(65) Prior Publication Data

US 2024/0239130 A1 Jul. 18, 2024

(30) Foreign Application Priority Data

Apr. 27, 2021 (DE) ..................... 10 2021 002 213.0

(51) Int. Cl.
*B42D 25/23* (2014.01)
*B42D 25/351* (2014.01)
*B42D 25/378* (2014.01)

(52) U.S. Cl.
CPC ........... *B42D 25/378* (2014.10); *B42D 25/23* (2014.10); *B42D 25/351* (2014.10)

(58) Field of Classification Search
CPC .... B42D 25/378; B42D 25/23; B42D 25/351; B42D 25/382; B42D 25/387; B42D 25/455; B42D 25/46
See application file for complete search history.

(56) References Cited

U.S. PATENT DOCUMENTS 3,279,826 A * 10/1966 Rudershausen ...... B42D 25/309 235/491
9,579,921 B2 2/2017 Kluge
(Continued)

FOREIGN PATENT DOCUMENTS

DE 102005039319 A1 2/2007
DE 102008012423 A1 5/2009
(Continued)

OTHER PUBLICATIONS

Translation of DE 102015212492 A1 (Year: 2017).*
(Continued)

*Primary Examiner* — Uzma Alam
*Assistant Examiner* — Mamadou Faye
(74) *Attorney, Agent, or Firm* — Workman Nydegger

(57) ABSTRACT

A security feature for a valuable document, includes at least one unit of information, a luminescent material designed to emphasize the unit of information being provided in the region of said unit of information.

12 Claims, 4 Drawing Sheets

(56) References Cited

U.S. PATENT DOCUMENTS

| | | | | |
|---|---|---|---|---|
| 9,842,451 | B2 | 12/2017 | Peinze et al. | |
| 11,766,885 | B2 | 9/2023 | Riedl et al. | |
| 2009/0051158 | A1* | 2/2009 | Scholz | B42D 25/29 283/92 |
| 2009/0206164 | A1 | 8/2009 | Kluge | |
| 2010/0320371 | A1* | 12/2010 | Agrawal | G06K 19/14 235/491 |
| 2012/0189159 | A1* | 7/2012 | Vincent | G09F 3/0341 29/458 |
| 2013/0042966 | A1* | 2/2013 | Look | B60R 13/105 156/227 |
| 2015/0339873 | A1 | 11/2015 | Peinze et al. | |
| 2022/0041004 | A1 | 2/2022 | Riedl et al. | |

FOREIGN PATENT DOCUMENTS

| | | | | |
|---|---|---|---|---|
| DE | 102012218053 | A1 | 1/2014 | |
| DE | 102015212492 | A1 * | 1/2017 | B42D 25/41 |
| DE | 102018007207 | B4 | 10/2020 | |
| DE | 102019113005 | A1 | 11/2020 | |
| WO | 2014111405 | A1 | 7/2014 | |

OTHER PUBLICATIONS

German Search Report from corresponding German Patent Application No. 102021002213.0, Jan. 24, 2022.

International Search Report from corresponding PCT Application No. PCT/EP2022/025180, Dec. 8, 2022.

* cited by examiner

SECURITY FEATURE FOR A VALUABLE DOCUMENT, VALUABLE DOCUMENT, METHOD FOR PRODUCING A SECURITY FEATURE AND METHOD FOR CHECKING A SECURITY FEATURE

BACKGROUND

The invention relates to a security feature for a value document, a value document, a method for producing a security feature, and a method for checking a security feature.

Value documents such as, for example, passport and identification documents, identity cards, credit cards, bank cards and the like are used to an increasing extent in public areas, but also within companies.

Personalized information on cards or identification documents is often very difficult to recognize under difficult lighting conditions, for example in translucent or window elements as well as in MLI or CLIP ID security elements, as disclosed for example in DE 10 2018 007 207 B4. In particular, pictures of the ID holder are generally difficult to check.

SUMMARY

It is therefore the object of the present invention to make these security features easier to recognize.

A security feature according to the invention for a value document comprises at least one information unit, wherein a luminescent substance is provided in the region of the information unit to illuminate the information unit.

A basic idea of the present invention is to design an information unit, such as for example a portrait, to be selectively illuminable. “Selectively” means that only or exclusively the information unit or the security feature is illuminated or visually highlighted in a value document, for example, while the rest of the security feature or value document remains dark, so to speak.

With the luminescence used here, the luminescent substance is brought into an excited state by externally supplied energy, for example by means of a UV emitter, and emits light while emitting photons during the transition to its basic state. Thanks to the luminescent substance and its special properties, only the luminescent material and therefore this area of the security feature can be specifically highlighted or illuminated, for example with UV light. Instead of a UV emitter, for example, an IR emitter or a laser source can be used. A laser source can be used in particular in combination with an anti-Stokes ink. In general, any source of electromagnetic waves such as, for example, UV light, IR light or daylight having a wavelength range of 400-700 nm can be used.

The luminescent substance can be independent of the safety function or feature; that is to say, the luminescent substance does not have to be a permanent component of the safety function. Rather, the luminescent substance can be an illumination or highlighting function functionally independent of the safety function.

The security feature proposed here therefore has the advantage of the selective or targeted highlighting of a security feature or its information unit, which leads to easier and clearer recognition and identifiability and also increased counterfeiting protection.

It can be provided that the luminescent substance is a photoluminescent substance. In particular, photoluminescence in the form of fluorescence or phosphorescence is considered here. A photoluminescent substance can be easily excited by using UV light which is already available for checking value documents. With fluorescence, emission of light ends immediately after excitation from the outside, whereas with phosphorescence, an afterglow occurs even when excitation has terminated.

It can further be provided that the luminescent substance is a white fluorescent substance. In particular when white fluorescence is used, with viewing under a UV light an effect can be achieved as if a light were switched on, or a light beam were focused onto the security feature. In this way, easier and clearer recognition and identifiability can be achieved, as well as increased counterfeiting protection. A simple production of a true-color fluorescent image is presented. In addition, the use of white fluorescence is color-neutral so that the highlighted information unit does not change in color.

It can be provided that the luminescent substance is arranged behind the information unit in a viewing direction of the security feature. This causes backlighting which increases contrast.

It can further be provided that the luminescent substance is printed on as a dye. The luminescent substance is then printed on in a targeted manner in the region of the information unit, for example by means of masking. The luminescent substance can also comprise individual pigments which are embedded in a carrier.

It can be provided that the luminescent substance is arranged on a film insert. Accordingly, the luminescent substance can be prepared before the actual production of the security feature or value document, which accelerates production.

It can further be provided that the identifiers comprise personal data such as a signature, a date of birth, a portrait or the like. In principle, all graphically displayable elements can be designed to be illuminated by means of a luminescent material.

It can be provided that the identifiers include data relating to the value document such as a period of validity, a card number, information about the issuing authority or the like. In principle, all graphically displayable elements can be designed to be illuminated by means of a luminescent material.

A value document according to the invention, such as a bank note, identification card or the like, comprises a security feature as described above. The security feature can be arranged, for example, in or on a substrate of the value document. Otherwise, the same advantages and modifications as described above apply.

A method according to the invention for producing a security feature for a value document comprises the steps of:

- providing an information unit, and
- introducing a luminescent substance in the region of the information unit such that it is configured to highlight the information unit.

The same advantages and modifications as described above apply.

A method according to the invention for checking a security feature of a value document comprises the steps of:

- irradiating the value document with a light source,
- highlighting the security feature by means of a luminescent substance of the value document which is being or has been excited by the light source, and
- checking the highlighted security feature.

For example, a UV emitter, an IR radiator or a laser source can be used as the light source. A light source is considered to be suitable if it can put the luminescent substance into an excited state; depending on the luminescent substance, this can also be daylight. The same advantages and modifications as described above apply.

BRIEF DESCRIPTION OF THE DRAWINGS

The present invention is described by way of example below with reference to the accompanying drawings. In the drawings.

DETAILED DESCRIPTION OF VARIOUS EMBODIMENTS

Figure 1:
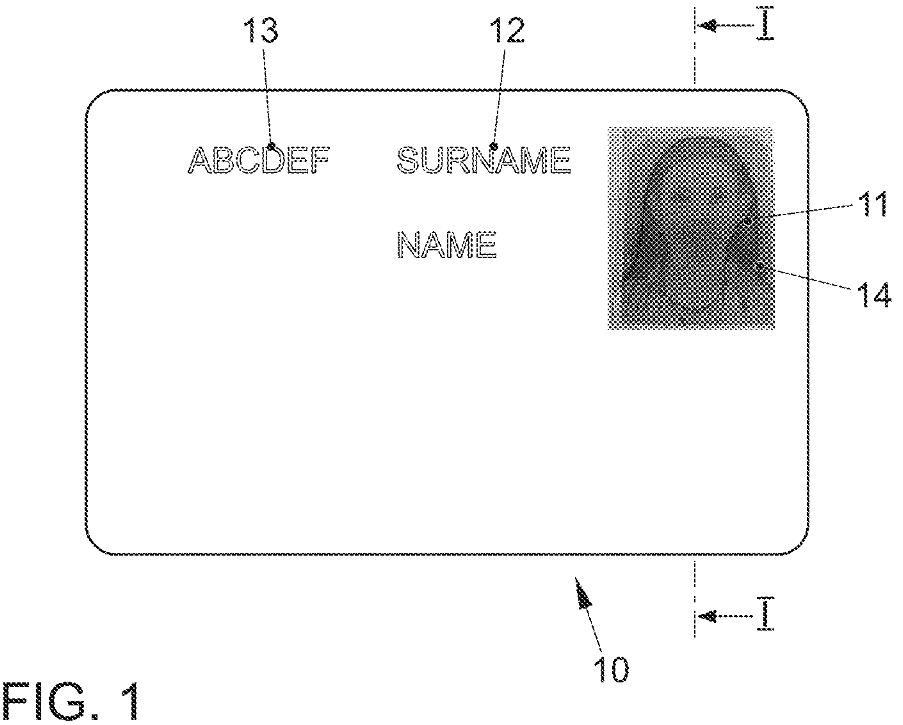
FIG. 1: shows a plan view of a value document.

FIG. 1 shows a plan view of a value document 10 in a schematic view. The value document 10 can be a bank note, a passport and identification document or the like. In the example shown in FIG. 1, the value document 10 is an identification document.

The value document 10 contains a security feature 11 in the form of a portrait of the card-holder as well as further personal data 12 such as, for example, the first and last names of the owner. In addition, the identification card may include further data 13 such as date of birth, nationality, issuing authority, date of issue and the like.

The security feature 11 contains an information unit 14 here in the form of the portrait. In this example, the visible part of the security feature 11 is formed by the information unit 14. It is also possible for the information unit 14 to occupy only a part of the visible surface of the security feature 11. The information unit 14 occupies only a part of the surface or main surface of the value document 10.

The basic design of the security feature 11 with the information unit 14 will now explained in more detail with reference to FIG. 2 which shows a section through the value document 10 along the line I-I of FIG. 1.

Figure 2:
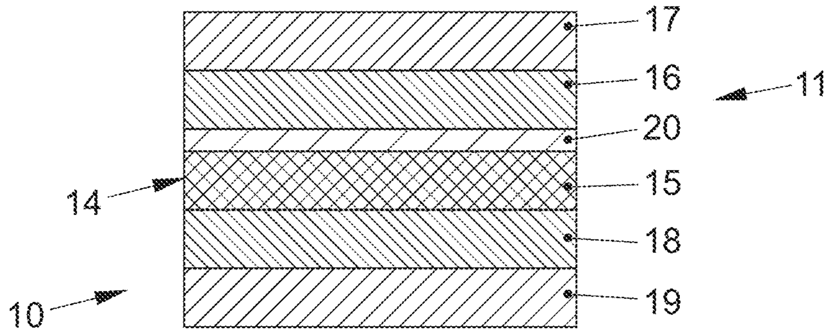
FIG. 2: shows a sectional illustration of the value document from FIG. 1 according to the line I-I.

FIG. 2 shows a sectional illustration of the value document 10 or of the security feature 11 of FIG. 1 according to the line I-I.

The value document 10 consists of a sequence or a stack of different layers such as, for example, films. These individual films are joined together in a production process to form the value document 10, for example by lamination. The security feature 11 can also consist of such a stack of individual layers or films. It is also possible for the security feature 11 to consist of a single film or a few films which then form the information unit 14.

In the example shown in FIG. 2, a centrally arranged design film 15 is provided as the information unit 14. The design film 15 can be opaque or transparent. It is also possible for the design film 15 to be transparent only in sections while being opaque in the other sections. The term film is used below for reasons of clarity. The term film naturally also includes any form of layer such as, for example, a printed-on ink layer. The information unit 14 can be formed in the design film 15 and on at least one of the two surfaces.

A film 16, which can likewise be opaque or transparent, is arranged on a first, in this case upper side of the design film 15. The film 16 can contain additional information or design elements. Furthermore, the film 16 can contain security features which can be visible or invisible within the visual range. The film 16 can also be an adhesive layer or adhesive film for an outer film 17. The outer film 17 is transparent, so that the film 16 and/or the design film 15 can be seen through the outer film 17. In addition, adhesives or the like can be provided between the films shown here for connecting the films to one another.

Two additional films 18 and 19 are arranged on a second opposite side of the design film 15, which corresponds to an underside in the illustration of FIG. 1. The film 18 can correspond to the film 16. The film 19 can correspond to the film 17.

A luminescent substance 20 is introduced between the design film 15 and the film 16. With luminescence, the substance is brought into an excited state by externally supplied energy and emits light as it transitions to its basic state while emitting photons. In particular, photoluminescence in the form of fluorescence or phosphorescence is considered here. The luminescent substance can be integrated, for example, as white fluorescence. The luminescent substance 20 can also be referred to as a luminescent layer or as a luminescent region.

The luminescent substance 20 by intention highlights defined regions of the security feature 11 or the value document 10. This is exactly the region in which the luminescent substance 20 is arranged. This enables easy recognition of the information unit 14, for example for border guards or police during a passport check or a driver's license check by means of a UV lamp or another light source, for example an IR lamp or a laser source. The activation of the luminescent material 20 results in indirect illumination of the information unit 14. Similarly, daylight can activate the luminescent material 20 when, for example, a passport is removed from a case or pocket during an outdoor inspection and is then exposed to daylight.

The luminescent substance 20 can be printed onto the design film 15 as an ink. Alternatively, the luminescent substance 20 can comprise individual pigments or consist thereof. Similarly, the luminescent material 20 can be formed as an independent film.

The value document 10 can contain a plurality of security features 11 with one or more information units 14 in each case.

The value document 10 can comprise additional films or layers, for example one or more protective layers or functional layers provided with other security elements. The films 16 and 18 or 17 and 19 can be optional.

The luminescent substance 20 can also be arranged at different locations on the value document 10 or the security feature 11. In particular, the luminescent substance 20 can be arranged between other layers or films than shown in FIG. 2. In particular, the luminescent substance 20 can be arranged below, i.e. behind, the design film 15 in the viewing direction. The luminescent substance 20 then acts like a backlight.

Different arrangements of the luminescent substance 20 in the value document 10 or the security feature 11 will be discussed with reference to the following figures.

Figure 3:
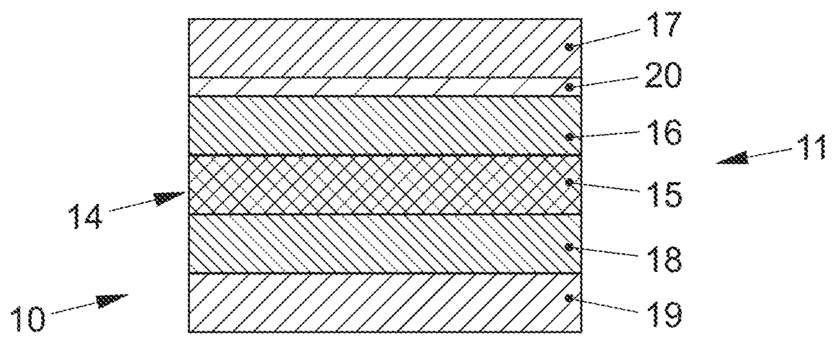
FIG. 3: shows a sectional view of a security feature or of a value document.

FIG. 3 shows a sectional view of a security feature 11 or of a value document 10. The central design film 15 and the additional films 16, 17, 18 and 19 are in a sequence identical to the sequence shown in FIG. 2. The luminescent substance 20 is now arranged on an upper side of the film 16. The luminescent substance 20 can also be arranged on an underside of the film 16. It is also possible for the luminescent substance 20 to be arranged on an upper side or underside of the film 18.

As shown in FIG. 3, the information unit 14 can be formed in or on the film 16. It is also possible for the information unit to be formed within the design film 15. The two films 15 and 16 can also jointly form the information unit 14. As described above, the luminescent substance 20 highlights the information unit 14 when it is being or has been illuminated.

Figure 4:
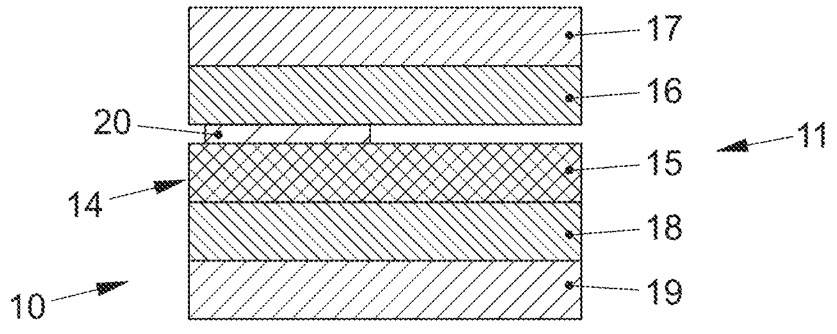
FIG. 4: shows a sectional view of a security feature or of a value document.

FIG. 4 shows a sectional view of a security feature 11 or of a value document 10, which corresponds structurally to the security feature 11 or to the value document 10 in FIG. 1. The arrangement of the luminescent substance 20 in the sequence of the films also corresponds to the arrangement shown in FIG. 1.

In contrast to FIG. 1, here in FIG. 4 the luminescent substance 20 is not formed over the entire surface of the security feature 11 but only in a section. Accordingly, during and/or after activation of the luminescent substance 20 by an external light unit, only that part of the information unit 14 is highlighted or illuminated which is located directly under the luminescent substance 20 or in the immediate vicinity thereof. The remaining part of the information unit, which here is located within the design film 15, is correspondingly not emphasized. It is therefore possible to not only selectively highlight a certain region of the value document of 10 but also a certain region of the security feature 11.

Figure 5:
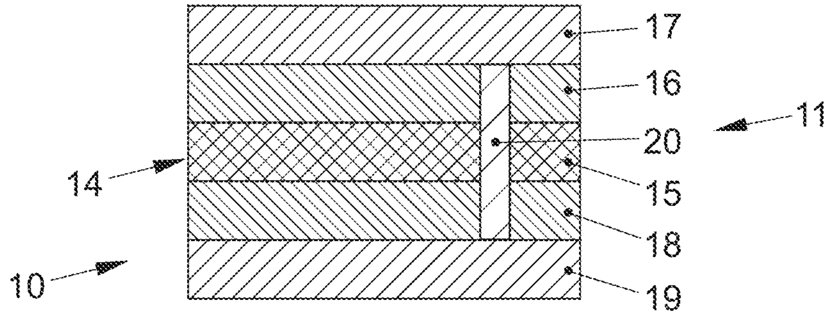
FIG. 5: shows a sectional view of a security feature or of a value document.

FIG. 5 shows a sectional view of a security feature 11 or of a value document 10. The general arrangement or sequence of the different films again corresponds to the sequence shown in the preceding figures.

In this example, the luminescent substance 20 does not extend as previously shown parallel to the films, but perpendicular to the films, i.e. parallel to a viewing direction. The luminescent substance 20 can be formed here, for example, as an insert within a window of the security feature 11 or of the value document 10. This arrangement of the luminescent substance 20 can enable a depth effect and/or a lateral illumination.

Figure 6A:
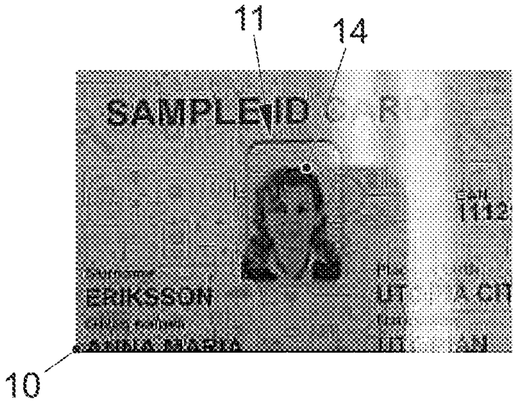
FIGS. 6*a*, 6*b*: show a plan view of a value document with a highlighted security feature.
Figure 6B:
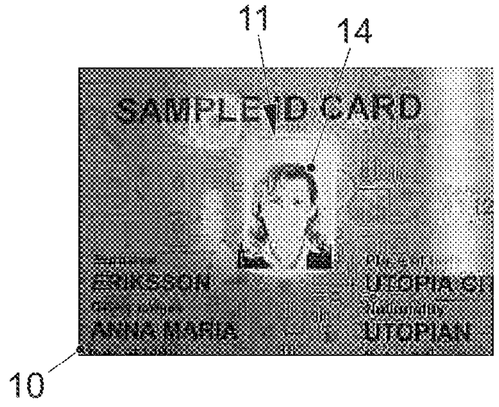

FIGS. **6*a* and 6*b* show a plan view of a value document 10 with a highlighted security feature (FIG. 6*a*) and non-highlighted security feature (FIG. 6*b***).

In FIG. **6*a*, the value document 10 is shown in a dormant state or a non-activated state of the luminescent material 20 in the form of a fluorescent material. The illumination is, for example, conventional room lighting which cannot put a fluorescent substance into an excited state. Accordingly, it is apparent that the security feature 11 of the value document 10 with the information unit 14 does not stand out visually from the other components or regions of the value document 10. In a darker environment, the information unit 14** in the form of the portrait is difficult to recognize.

In FIG. **6*b*, the value document 10 is shown when the luminescent substance 20 is in an activated state. The illumination is, for example, a fluorescent lamp that puts the luminescent substance, such as a fluorescent substance, into an excited state. Accordingly, it is apparent that the security feature 11 of the value document 10 with the information unit 14 stands out visually from the other components or regions of the value document 10. The information unit 14** in the form of the portrait appears illuminated and therefore easy to recognize.

Figure 7:
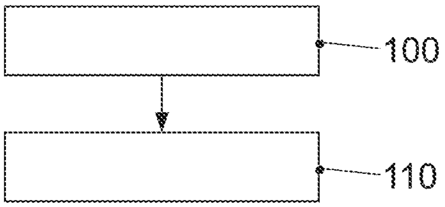
FIG. 7: shows a method for producing a security feature for a value document.

FIG. 7 shows a method for producing a security feature 11 for a value document 10.

In a first step 100, an information unit 14 is provided. The information unit 14 can be achieved, for example, by joining one or more films or layers together.

In a second step 110, a luminescent substance 20 is introduced in the region of the information unit 14 such that it is configured to highlight the information unit 14. In this way, a security feature 11 can be produced as shown in the figures.

The sequence of the steps is not necessarily limited to this sequence. For example, the luminescent substance 20 can also be introduced first.

For the production of a value document 10, the security feature 11 produced in this way can be integrated into a value document or formed into a value document 10 by means of additional components such as a substrate or films.

Figure 8:
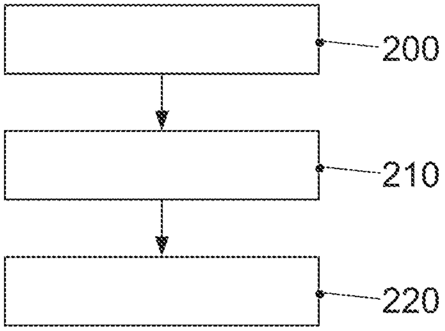
FIG. 8: shows a method for checking a security feature of a value document.

FIG. 8 shows a method for checking a security feature 11 of a value document 10.

In a first step 200, the value document 10 is irradiated with a light source. For example, a florescent lamp can serve as the light source or illumination. The light source is suitable for putting the luminescent substance 20, such as a fluorescent substance, into an excited state.

In a second step 210, the security feature 11 is highlighted by a luminescent substance of the value document 10 which is being excited or has been excited by the light source. The luminescent substance 20 now emits light in the transition to its basic state while emitting photons. Accordingly, it is apparent that the security feature 11 of the value document 10 with the information unit 14 stands out visually from the other components or regions of the value document 10. The information unit 14 in the form of the portrait appears illuminated and therefore easy to recognize.

The two steps 200 and 210 can also be carried out simultaneously.

In a third step 220, the highlighted security feature 11 is checked. The now highlighted security feature 11 or its information unit 14 can now be checked visually in a simple manner and without confusion since it is illuminated or backlit by the luminescent material 20.

All three steps 200, 210 and 220 can also be carried out simultaneously.

The invention claimed is:

1. A value document comprising:
a sequence of films, and
a security feature having at least one information unit, wherein the at least one information unit includes a luminescent substance configured to highlight the information unit,
wherein the luminescent substance is arranged on a film insert, and
wherein the luminescent substance extends perpendicular to and through the sequence of films of the value document.

2. The value document according to claim 1, wherein the luminescent substance is a photoluminescent substance.

3. The value document according to claim 1, wherein the luminescent substance is a white, fluorescent substance.

4. The value document according to claim 1, wherein the luminescent substance is arranged behind the information unit in a viewing direction of the security feature.

5. The value document according to claim 1, wherein the luminescent substance is printed on as an ink.

6. The value document according to claim 1, wherein the information unit comprises personal data, and a portrait.

7. The value document according to claim 1, wherein the information unit comprises data relating to the value document, a card number, and information about the issuing authority.

8. The value document of claim 1, wherein the value document is a bank note, passport and identification documents, with a security feature according to claim 1.

9. A method for producing a security feature for a value document, the value document include a sequence of films and the security feature, the method comprising:

providing an information unit, and introducing a luminescent substance in the region of the information unit wherein the luminescent substance is configured to highlight the information unit, wherein the luminescent substance is arranged on a film insert, and wherein the luminescent substance extends perpendicular to and through the sequence of films of the value document.

10. A method for checking a security feature of a value document, the value document including a sequence of films and the security feature, the method comprising:

irradiating the value document with a light source, highlighting the security feature by means of a luminescent substance of the value document which is being or has been excited by the light source, and checking the highlighted security feature, wherein the luminescent substance is arranged on a film insert, and wherein the luminescent substance extends perpendicular to and through the sequence of films of the value document.

11. The value document according to claim 1, wherein the luminescent substance comprises individual pigments.

12. The value document according to claim 1, wherein the luminescent substance provides at least one of a depth effect or a lateral illumination effect.

* * * * *